United States Patent
Park et al.

(10) Patent No.: US 11,217,394 B2
(45) Date of Patent: Jan. 4, 2022

(54) MULTILAYER CAPACITOR

(71) Applicant: SAMSUNG ELECTRO-MECHANICS CO., LTD., Suwon-si (KR)

(72) Inventors: Byeong Gyu Park, Suwon-si (KR); So Ra Kang, Suwon-si (KR); Yong Jin Yun, Suwon-si (KR); Jea Yeol Choi, Suwon-si (KR); Jung Min Park, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 172 days.

(21) Appl. No.: 16/522,126

(22) Filed: Jul. 25, 2019

(65) Prior Publication Data

US 2020/0075258 A1 Mar. 5, 2020

(30) Foreign Application Priority Data

Aug. 29, 2018 (KR) .................. 10-2018-0102001
Oct. 16, 2018 (KR) .................. 10-2018-0123342

(51) Int. Cl.
*H01G 4/30* (2006.01)
*H01G 4/228* (2006.01)
(Continued)

(52) U.S. Cl.
CPC .............. *H01G 4/30* (2013.01); *H01G 4/012* (2013.01); *H01G 4/12* (2013.01); *H01G 4/228* (2013.01)

(58) Field of Classification Search
CPC ............ H01G 4/012; H01G 4/12; H01G 4/30; H01G 4/228
See application file for complete search history.

(56) References Cited

U.S. PATENT DOCUMENTS

| 2007/0211404 A1 | 9/2007 | Kojima et al. |
| 2013/0222972 A1 | 8/2013 | Saito et al. |

(Continued)

FOREIGN PATENT DOCUMENTS

| JP | 11-297566 A | 10/1999 |
| JP | 2007-243040 A | 9/2007 |

(Continued)

OTHER PUBLICATIONS

Korean Office Action dated Sep. 20, 2019 issued in Korean Patent Application No. 10-2018-0123342 (with English translation).

*Primary Examiner* — Nathan Milakovich
(74) *Attorney, Agent, or Firm* — Morgan, Lewis & Bockius LLP

(57) ABSTRACT

A multilayer capacitor includes a body, a plurality of internal electrodes and external electrodes disposed on external surfaces of the body and electrically connected to the internal electrodes, wherein in the body, corners of cover portions include curved surfaces, and 10 μm≤R≤T/4 in which R is a radius of curvature of the curved surface corners and T is a thickness of the body, and when a distance from a surface of the body to an internal electrode closest to the surface of the body among the plurality of internal electrodes is a margin, a margin (δ) of each of the corners formed as the curved surfaces in the cover portions is greater than or equal to a margin (Wg) of the body in a width direction.

18 Claims, 13 Drawing Sheets

(51) Int. Cl.
    *H01G 4/12*         (2006.01)
    *H01G 4/012*      (2006.01)

(56) References Cited

U.S. PATENT DOCUMENTS

| | | | |
|---|---|---|---|
| 2015/0021073 A1* | 1/2015 | Kim | H01G 2/065 |
| | | | 174/258 |
| 2015/0348712 A1* | 12/2015 | Lee | H01G 4/248 |
| | | | 174/260 |
| 2017/0011852 A1 | 1/2017 | Miyazaki | |
| 2017/0040111 A1 | 2/2017 | Kim et al. | |
| 2017/0213647 A1 | 7/2017 | Ahn | |
| 2018/0182555 A1* | 6/2018 | Kowase | H01G 4/224 |
| 2019/0318872 A1* | 10/2019 | Mizuno | H01G 4/30 |
| 2020/0027661 A1* | 1/2020 | Park | H01G 2/065 |
| 2020/0075242 A1* | 3/2020 | Kang | H01G 4/232 |
| 2020/0075259 A1* | 3/2020 | Park | H01G 4/30 |
| 2020/0075260 A1* | 3/2020 | Yun | H01G 4/232 |
| 2020/0152390 A1* | 5/2020 | Yeon | H01G 4/228 |
| 2020/0152391 A1* | 5/2020 | Kang | H01G 4/12 |

FOREIGN PATENT DOCUMENTS

| | | |
|---|---|---|
| JP | 2011-3845 A | 1/2011 |
| KR | 10-2013-0087032 A | 8/2013 |
| KR | 10-2017-0007157 A | 1/2017 |
| KR | 10-1701049 B1 | 1/2017 |
| KR | 10-2017-0087665 A | 7/2017 |

* cited by examiner

MULTILAYER CAPACITOR

CROSS-REFERENCE TO RELATED APPLICATION(S)

This application claims the benefit of priority to Korean Patent Applications No. 10-2018-0102001 filed on Aug. 29, 2018 and No. 10-2018-0123342 filed on Oct. 16, 2018 in the Korean Intellectual Property Office, the entire disclosures of which are incorporated herein by reference.

TECHNICAL FIELD

The present disclosure relates to a multilayer capacitor.

BACKGROUND

A capacitor is an element that may store electricity therein, and when a voltage is applied to the capacitor in a state in which two electrodes are basically disposed to face each other, electricity is accumulated in the respective electrodes. When a direct current (DC) voltage is applied to the capacitor, a current flows in the capacitor while the electricity is accumulated, but when the accumulation of the electricity is completed, the current does not flow in the capacitor. Meanwhile, when an alternating current (AC) voltage is applied to the capacitor, an AC current flows in the capacitor while polarities of the electrodes are alternated.

Such a capacitor may be divided into several kinds of capacitors such as an aluminum electrolytic capacitor in which electrodes are formed of aluminum and a thin oxide layer is disposed between the electrodes formed of aluminum, a tantalum capacitor in which tantalum is used as an electrode material, a ceramic capacitor in which a dielectric material having a high dielectric constant such as a barium titanate is used between electrodes, a multilayer ceramic capacitor (MLCC) in which ceramic having a high dielectric constant is used in a multilayer structure as a dielectric material provided between electrodes, a film capacitor in which a polystyrene film is used as a dielectric material provided between electrodes, and the like, depending on a kind of insulator provided between electrodes.

Among them, the multilayer ceramic capacitor has been recently used mainly in various fields such as a high frequency circuit, and the like, since it has excellent temperature characteristics and frequency characteristics and may be implemented at a small size.

A multilayer ceramic capacitor according to the related art includes a laminate formed by stacking a plurality of dielectric sheets and external electrodes disposed on external surfaces of the laminate and having different polarities, wherein internal electrodes alternately stacked in the laminate may be electrically connected to the respective external electrodes.

Recently, in accordance with miniaturization and an increase in a degree of integration of an electronic product, many studies on miniaturization and an increase in a degree of integration of the multilayer ceramic capacitor have been conducted. Particularly, in the multilayer ceramic capacitor, various attempts to increase the number of stacked dielectric layers and improve connectivity of internal electrodes by decreasing thicknesses of the dielectric layers in order to increase a capacitance of the multilayer ceramic capacitor and miniaturize the multilayer ceramic capacitor have been conducted.

Particularly, in developing a multilayer ceramic capacitor having an ultrahigh capacitance, it has become more important to secure reliability of a product in which the numbers of stacked thin film dielectric layers and internal electrodes are many. As the numbers of stacked dielectric layers and internal electrodes are increased, steps due to thickness differences between the internal electrodes and the dielectric layers are increased. These steps cause warpage phenomena of distal end portions of the internal electrodes due to stretching of the dielectric layers in a transversal direction in a densifying process of compressing a body.

That is, the distal end portions of the internal electrodes are bent in order to fill the steps, and in margin portions, empty spaces due to the steps are removed by depression of covers and a reduction in a margin width. The empty spaces due to the steps are removed, such that capacitance layers are also stretched by the reduced margin width. Reliability of the multilayer ceramic capacitor such as withstand voltage characteristics or the like is reduced due to structural irregular stretching of the internal electrodes as described above.

In order to solve such a problem, a method of cutting opposite end surfaces of the body in a length direction and then attaching end surface margin portions to the opposite end surfaces has been developed. However, such a method may be complicated, such that productivity may be low, and when the end surface margin portions are formed to have a small thickness, a thickness of corner margin portions also becomes small, such that moisture resistance reliability of the body is deteriorated.

SUMMARY

An aspect of the present disclosure may provide a multilayer capacitor in which an effective volume may be significantly increased and moisture resistance reliability may be secured.

According to an aspect of the present disclosure, a multilayer capacitor may include a body including a stacked structure of a plurality of dielectric layers and a plurality of internal electrodes stacked with each of the plurality of dielectric layers interposed therebetween; and external electrodes disposed on external surfaces of the body and electrically connected to the plurality of internal electrodes, wherein the body includes an active portion forming a capacitance by the plurality of internal electrodes disposed therein and cover portions disposed on upper and lower surfaces of the active portion, respectively, in a stacking direction of the plurality of dielectric layers, the body has a first surface and a second surface, to which the plurality of internal electrodes are exposed, opposing each other, a third surface and a fourth surface which oppose each other in the stacking direction, and a fifth surface and a sixth surface which are connected to the first to fourth surfaces and oppose each other. In the body, corners of the cover portions may include curved surfaces, and 10 µm≤R≤T/4 in which R is a radius of curvature of the curved surfaces and T is a thickness of the body in the stacking direction. A margin (δ) of each of the corners of the cover portions is greater than or equal to a margin (Wg) of side portions of the body, where the margin (δ) is a distance from a surface of the corners of the cover portions to a closest portion of the plurality of internal electrodes, and the margin (Wg) is a distance from the fifth or sixth surface of the body to a closest portion of the plurality of internal electrodes.

In the cover portions, corners at which the third surface is connected to the fifth surface and the sixth surface and corners at which the fourth surface is connected to the fifth surface and the sixth surface may include curved surfaces.

$1 \leq \delta/Wg \leq 1.2$.

$0.5 \ \mu m \leq Wg \leq T/12$.

$0.5 \ \mu m \leq Wg \leq 15 \ \mu m$.

Wg<Tg in which Tg is a margin of each of the third surface and the fourth surface.

10 $\mu m \leq R \leq 60 \ \mu m$ in which R is the radius of curvature.

The margin ($\delta$) of each of the corners formed as the curved surfaces in the cover portions may be smaller than the radius (R) of curvature.

The plurality of internal electrodes may have a uniform width.

In the body, when outer regions surrounding the plurality of internal electrodes are margin regions, a density of the dielectric layer may be lower in the margin regions than in the other regions.

According to another aspect of the present disclosure, a multilayer capacitor may include a body including a stacked structure of a plurality of dielectric layers and a plurality of internal electrodes stacked with each of the plurality of dielectric layers interposed therebetween; and external electrodes disposed on external surfaces of the body and electrically connected to the plurality of internal electrodes, wherein the body includes an active portion forming a capacitance by the plurality of internal electrodes disposed therein and cover portions disposed on upper and lower surfaces of the active portion, respectively, in a stacking direction of the plurality of dielectric layers, the body has a first surface and a second surface, to which the plurality of internal electrodes are exposed, opposing each other, a third surface and a fourth surface which oppose each other in the stacking direction, and a fifth surface and a sixth surface which are connected to the first to fourth surfaces and oppose each other. In the body, corners of the cover portions include curved surfaces. A margin ($\delta$) of each of the corners of the cover portions is greater than or equal to a margin (Wg) of side portions of the body, where the margin ($\delta$) is a distance from a surface of the corners of the cover portions to a closest portion of the plurality of internal electrodes, and the margin (Wg) is a distance from the fifth or sixth surface of the body to a closest portion of the plurality of internal electrodes. In the body, when an outer region surrounding the plurality of internal electrodes is a margin region, a density of a dielectric layer in the margin region is lower than a density of a dielectric layer in other regions.

In the margin region, the plurality of dielectric layers may include at least two layers having different densities, and a density of a dielectric layer adjacent to the plurality of internal electrodes may be higher than a density of another dielectric layer of the at least two layers.

The margin region may include a plurality of pores.

The plurality of pores may be needle-like pores.

The plurality of pores may have a form in which they are aligned in a shape corresponding to an outer shape of the body.

The plurality of pores may be composed of a plurality of rows, where each row is defined as a row of pores that are aligned in the shape corresponding to the outer shape of the body.

Pore densities of the plurality of rows may be different from one another, and a pore density of a region closer to an outer surface of the body may be lower than densities of other regions in the plurality of rows.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Hereinafter, exemplary embodiments of the present disclosure will now be described in detail with reference to the accompanying drawings.

Figure 1:
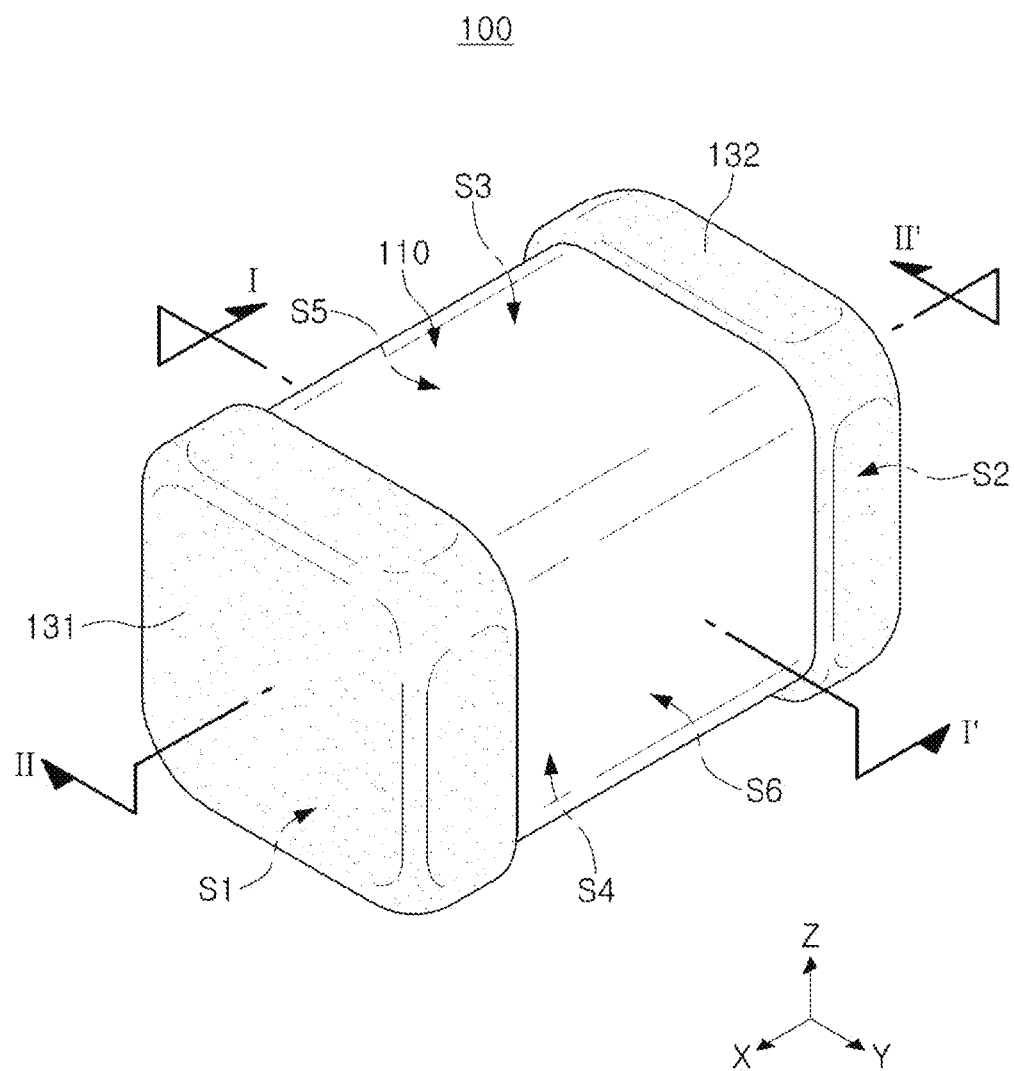
FIG. 1 is a schematic perspective view illustrating a multilayer capacitor according to an exemplary embodiment of the present disclosure.
Figure 2:
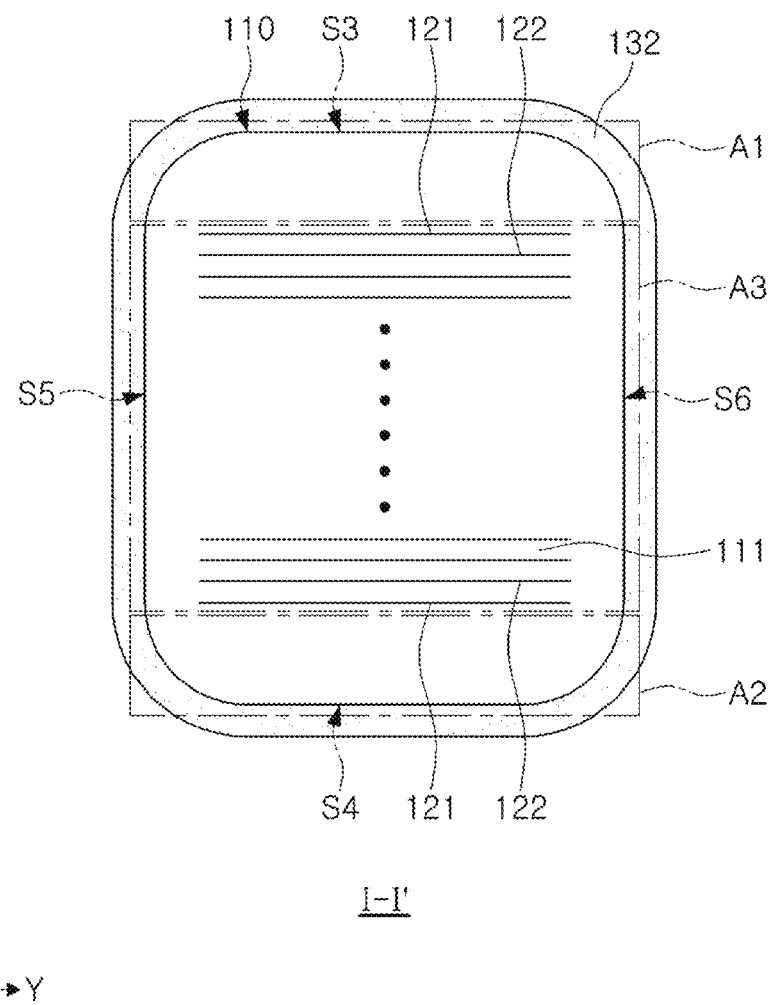
FIGS. 2 and 4 are cross-sectional views taken along line I-I' of the multilayer capacitor of FIG. 1, and in FIG. 4, an outer side of a region in which internal electrodes are disposed is denoted by dotted lines.
Figure 3:
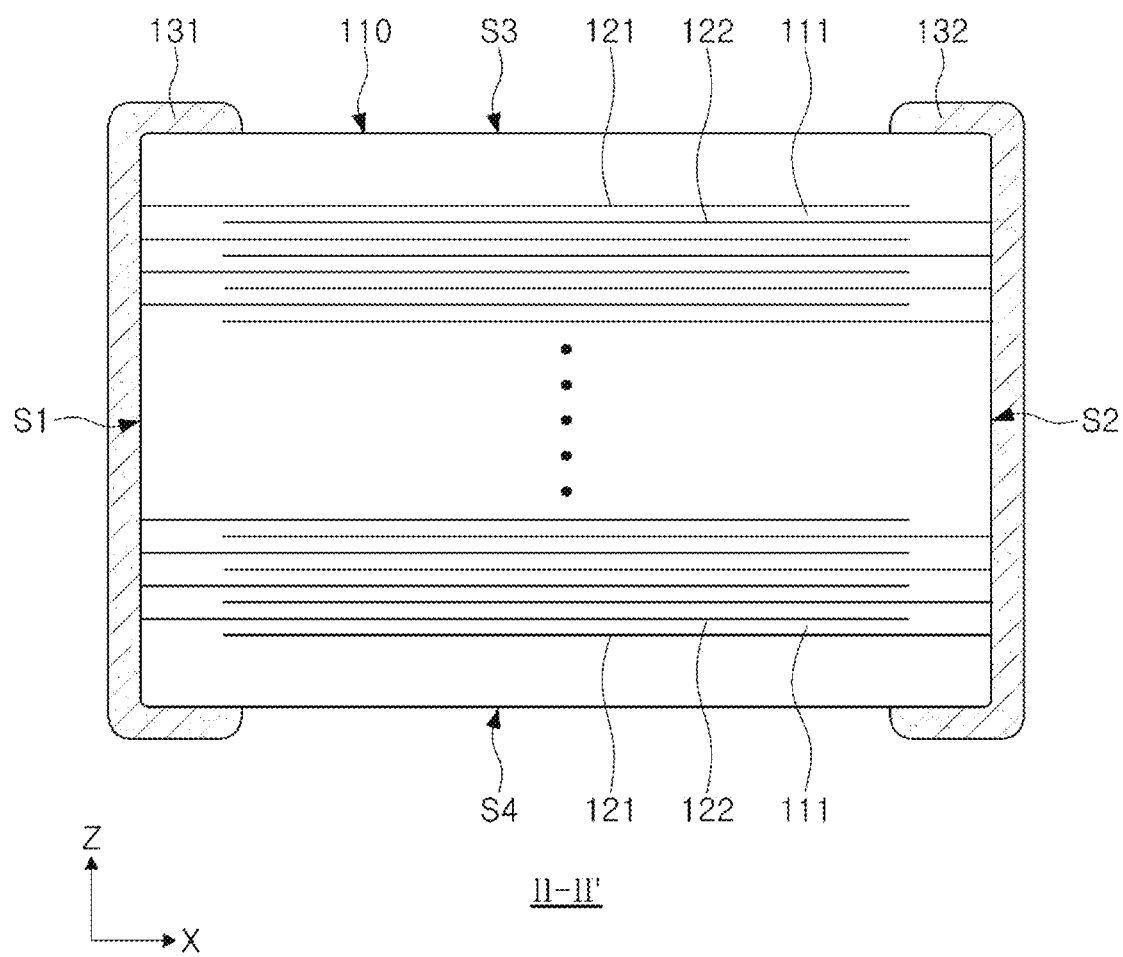
FIG. 3 is a cross-sectional view taken along line II-II' of the multilayer capacitor of FIG. 1.
Figure 4:
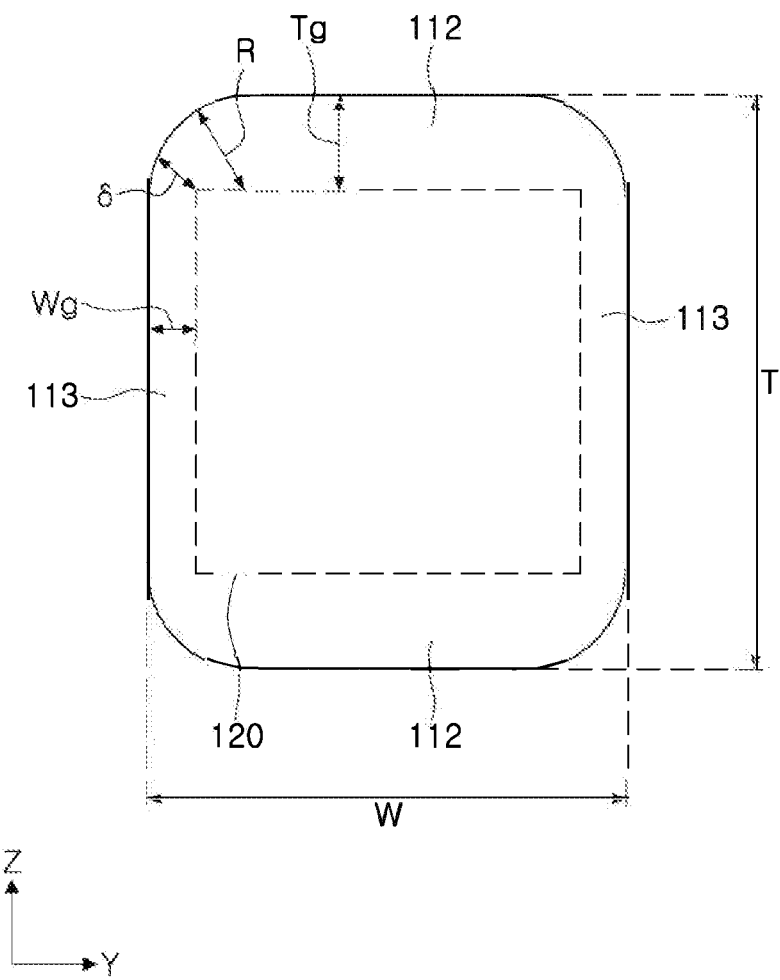

FIG. 1 is a schematic perspective view illustrating a multilayer capacitor according to an exemplary embodiment of the present disclosure. FIGS. 2 and 4 are cross-sectional views taken along line I-I' of the multilayer capacitor of FIG. 1, and in FIG. 4, an outer side of a region in which internal electrodes are disposed is denoted by dotted lines. FIG. 3 is a cross-sectional view taken along line II-II' of the multilayer capacitor of FIG. 1.

Referring to FIGS. 1 through 4, a multilayer capacitor 100 according to an exemplary embodiment of the present disclosure may include a body 110 including dielectric layers 111 and a plurality of internal electrodes 121 and 122 stacked with each of the dielectric layers 111 interposed therebetween, and external electrodes 131 and 132. In the body 110, corners of cover portions A 1 and A2 may be curved surfaces. In this case, as described below, 10 $\mu m \leq R \leq T/4$ in which R is a radius of curvature of the curved surface corners of the cover portions A1 and A2 in the body 110 and T is a thickness of the body 110.

Figure 11:
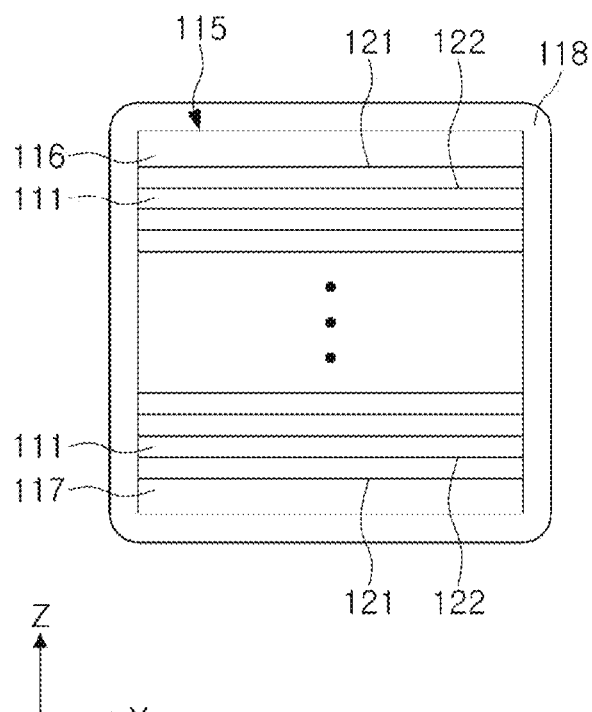

The body 110 may have a form in which a plurality of dielectric layers 111 are stacked, and may be obtained by stacking and then sintering, for example, a plurality of green sheets. The plurality of dielectric layers 111 may have a form in which they are integrated with one another by such a sintering process. A shape and a dimension of the body 110 and the number of stacked dielectric layer 111 are limited to those illustrated in the present exemplary embodiment, and the body 110 may have a shape similar to a rectangular parallelepiped shape, for example, as illustrated in FIG. 11. The body 110 may have a first surface S1 and a second surface S2 to which the internal electrodes 121 and 122 are exposed, respectively, a third surface S3 and a fourth surface S4 opposing each other in a stacking direction (Z direction) of the plurality of dielectric layers 111, and a fifth surface S5 and a sixth surface S6 connected to the first to fourth surfaces S1, S2, S3, and S4 and opposing each other.

The dielectric layer 111 included in the body 110 may include a ceramic material having a high dielectric constant, for example, a BT-based ceramic material, that is, barium titanate ($BaTiO_3$)-based ceramic material, but may include another material known in the related art as long as a sufficient capacitance may be obtained. The dielectric layer 111 may further include an additive, an organic solvent, a plasticizer, a binder, a dispersant, and the like, if necessary, together with the ceramic material, which is a main component. Here, the additives may include a metal component, and may be added in a metal oxide form in a manufacturing process. An example of such a metal oxide additive may include at least one of $MnO_2$, $Dy_2O_3$, BaO, MgO, $Al_2O_3$, $SiO_2$, $Cr_2O_3$, and $CaCO_3$.

Each of the plurality of internal electrodes 121 and 122 may be obtained by printing and then sintering a paste including a conductive metal at a predetermined thickness on one surface of the ceramic green sheet. In this case, the plurality of internal electrodes 121 and 122 may include first and second internal electrodes 121 and 122 exposed, respectively, to the first surface S1 and the second surface S2 of the body 110 opposing each other, as illustrated in FIG. 3. In this case, the first and second internal electrodes 121 and 122 may be connected to different external electrodes 131 and 132, respectively, to have different polarities when the multilayer capacitor is driven, and may be electrically separated from each other by each of the dielectric layers 111 disposed therebetween. As in an illustrated form, the plurality of internal electrodes 121 and 122 may have a uniform width. However, according to another exemplary embodiment, the number of external electrodes 131 and 132 and a connection manner of the internal electrodes 121 and 122 may be changed. A main material of the internal electrodes 121 and 122 may include, for example, nickel (Ni), copper (Cu), palladium (Pd), silver (Ag), or the like, or alloys thereof.

The external electrodes 131 and 132 may include first and second external electrodes 131 and 132 disposed on external surfaces of the body 110 and electrically connected, respectively, to the first and second internal electrodes 121 and 122. The external electrodes 131 and 132 may be formed by a method of manufacturing a material including a conductive metal in a form of a paste and then applying the paste to the body 110, and the conductive metal may include, for example, nickel (Ni), copper (Cu), palladium (Pd), gold (Au), or alloys thereof. In addition, the external electrodes 131 and 132 may further include plating layers, if necessary, in order to mount the multilayer capacitor 100 on a board.

In the present exemplary embodiment, corners of the body 110 may include curved surfaces to suppress a chipping defect. In addition, structural characteristics of the body 110 according to the present exemplary embodiment can be detailed as follows. Specifically, when a distance from a surface of the body 110 to an internal electrode closest to the surface of the body 110 among the plurality of internal electrodes 121 and 122 is defined as a margin, a margin of each of the corners formed as the curved surfaces in the cover portions A1 and A2 may be greater than or equal to a margin of the body 110 in a width direction, which will be described below.

In the present exemplary embodiment, a size of the margin, a radius of curvature of the curved surface, a thickness, a length, and the like, in the body 110 may be determined based on a desired performance of the multilayer capacitor. The multilayer capacitor 100 according to exemplary embodiments of the present disclosure may have a high level of capacitance in spite of being miniaturized, and furthermore, may have an improved moisture resistance reliability. This will hereinafter be described in detail.

The body 110 may be divided into an active portion A3 and the cover portions A1 and A2. Here, the active portion A3 may correspond to a region forming a capacitance by the plurality of internal electrodes 121 and 122 disposed therein. The cover portions A1 and A2 may be disposed on upper and lower surfaces of the active portion A3, respectively, in the stacking direction (the Z direction in the drawings) of the plurality of dielectric layers 111.

As described above, in the cover portions A1 and A2 of the body 110, the corners may include the curved surfaces, which may serve to reduce the chipping defect of the multilayer capacitor 100. In detail, in the cover portions A1 and A2, corners (upper curved surface corners in FIG. 2) at which the third surface S3 is connected to the fifth surface S5 and the sixth surface S6 and corners (lower curved surface corners in FIG. 2) at which the fourth surface S4 is connected to the fifth surface S5 and the sixth surface S6 may include curved surfaces.

Optimal conditions of the size of the margin and the radius of curvature, the thickness, the length, and the like, of the curved surface in the body 110 will be described with reference to FIG. 4. In FIG. 4, a region in which the internal electrodes 121 and 122 are disposed is defined as an internal electrode region 120 and is denoted by dotted lines. In this case, a Z direction refers to a thickness direction of the body 110, a Y direction refers to a width direction of the body 110, and T and W refer to a thickness and a width of the body 110, respectively.

First, a margin of the body 110 may refer to a distance from the surface of the body 110 to the internal electrode closest to the surface of the body 110 among the plurality of internal electrodes. In detail, a margin of each of the corners formed as the curved surfaces in the cover portions A1 and A2 may be δ. In addition, a margin of each of the fifth surface S5 and the sixth surface S6 may be Wg, which corresponds to a margin of the body 110 in the width direction. In the present exemplary embodiment, the margin δ of the curved surface corner may be greater than or equal to the margin Wg of the body 110 in the width direction. In the related art, the internal electrodes were not aligned with each other, such that it was difficult to form the margin of the body in the width direction. In order to solve such a problem, a process of separately forming the margin of the body in the width direction was used. In such a structure, it is difficult to sufficiently secure the margin δ of the curved surface corner of the body 110, and particularly in a case in which the body 110 is miniaturized and the number of stacked internal electrodes is increased, moisture resistance reliability of the body 110 is deteriorated.

In the present exemplary embodiment, as described below, the corners of the body 110, more specifically, the corners of the cover portions A1 and A2 may include the curved surfaces by a process of spraying a ceramic paste. Due to such a form, the margin δ of the curved surface corner may be sufficiently secured, and may be greater than or equal to the margin Wg of the body 110 in the width direction. In more detail, $1 \le \delta/Wg \le 1.2$ in which δ is the margin of the curved surface corner and Wg is the margin of the body 110 in the width direction. When the margin δ of the curved surface corner exceeds 1.2 times the margin Wg of the body 110 in the width direction, widths of the internal electrodes 121 and 122 in the cover portions A1 and A2 may be significantly reduced. As such a capacitance may be reduced.

As the margin δ of the curved surface corner is increased, the moisture resistance reliability may be improved even in the miniaturized body 110, and the body 110 may include a number of internal electrodes 121 and 122 to implement an improved capacitance. This means an increase in the capacitance, that is, an effective volume, when calculated on the basis of the same volume of the body 110.

Meanwhile, in the present exemplary embodiment, the internal electrodes 121 and 122 disposed in the active portion A3 may have a uniform width. The uniform width of the internal electrodes 121 and 122 may be achieved by a process of dicing a ceramic laminate in individual chip units, as described below. Here, uniformity of the width of the internal electrodes 121 and 122 may be determined on the basis of positions of end portions of the internal electrodes 121 and 122, and a deviation of the positions of the end portions of the internal electrodes 121 and 122 in the width direction (the Y direction) may be smaller than or equal to 0.1 µm.

In addition, Wg<Tg in which Tg is a margin of the body 110 in the thickness direction, that is, a margin of each of the third surface S3 and the fourth surface S4, and Wg is the margin of the body 110 in the width direction. As described below, the margin Tg of the body 110 in the thickness direction and the margin Wg of the body 110 in the width direction may be formed by the same process. When dielectric layers corresponding to base layers 116 and 117 for covers are disposed on the uppermost and lowermost internal electrodes 121 and 122, respectively, the margin Tg of the body 110 in the thickness direction may be slightly greater than the margin Wg of the body 110 in the width direction. In addition, 0.5 µm≤Wg≤15 µm in which Wg is the margin of the body 110 in the width direction, and the margin Wg of the body 110 in the width direction may be designed in order to secure the moisture resistance reliability of the body 110 and secure a sufficient capacitance. Likewise, 0.5 µm≤Tg≤15 µm in which Tg is the margin of the body 110 in the thickness direction. In addition, the margin Wg of the body 110 in the width direction may be set in consideration of the thickness T of the body 110, and specifically, 0.5 µm≤Wg≤T/12. Here, the thickness T of the body 110 may be, for example, about 200 to 400 µm.

In addition, the radius R of curvature of each of the corners formed as the curved surfaces in the cover portions A1 and A2 may be designed to endure a weight of the multilayer capacitor 100 and chipping due to a load in a process, and specifically, the radius R of curvature is in a range of 10 µm≤R≤60 µm. In another exemplary embodiment of the present disclosure, the radius R of curvature may be set in consideration of the thickness T of the body 110, and specifically, is in a range of 10 µm≤R≤T/4. As described above, the thickness T of the body 110 may be, for example, about 200 to 400 µm. In addition, as illustrated in FIG. 4, in the curved surface corners of the cover portions A1 and A2, the margin δ may be smaller than the radius R of curvature.

Meanwhile, in the body 110, when outer regions surrounding the plurality of internal electrodes 121 and 122, that is, regions surrounding the internal electrode region 120 in FIG. 4 are margin regions 112 and 113, a density of the dielectric layer 111 may be lower in the margin regions 112 and 113 than in the other regions. As described below, the margin regions 112 and 113 may be obtained in a manner of manufacturing and then coating a ceramic laminate, and a difference in the density may be due to a difference in such a manufacturing manner. Here, the density may be understood as a concept that is inversely proportional to a density of pores existing in the dielectric layer.

An example of a method of manufacturing the multilayer capacitor will be described with reference to FIGS. 5 through 13 in order to more clearly understand the structure of the multilayer capacitor described above.

Figure 5:
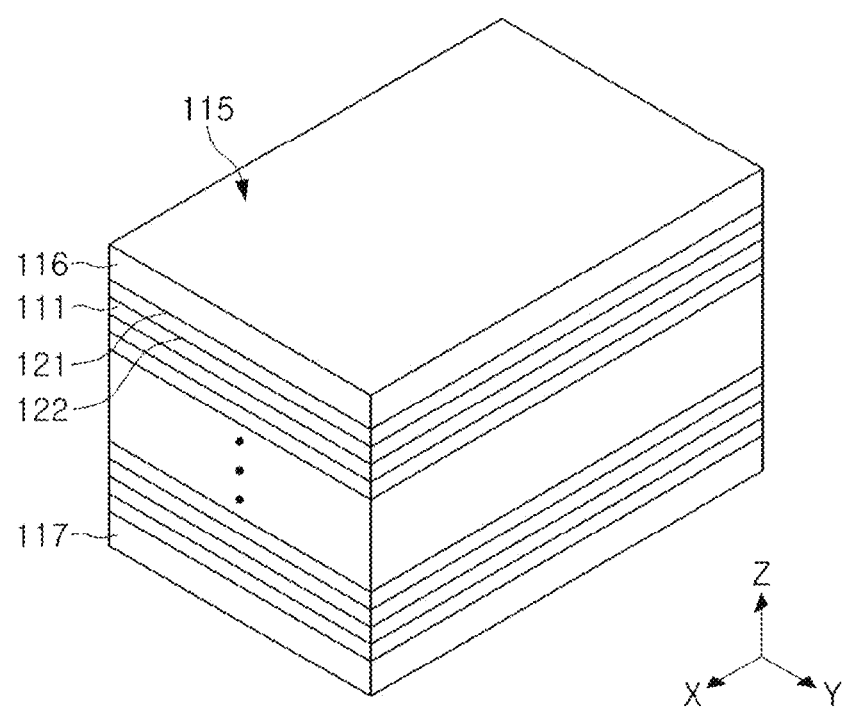
FIGS. 5 through 13 are views illustrating manufacturing processes of a multilayer capacitor according to an exemplary embodiment of the present disclosure.

First, as illustrated in FIG. 5 according to an exemplary embodiment of the present disclosure, a ceramic laminate 115 may be prepared by stacking the dielectric layers 111 and the internal electrodes 121 and 122. Here, since the dielectric layer 111 is in a state before being sintered, the dielectric layer 111 may be in a state of a ceramic green sheet. The ceramic green sheet may be manufactured by mixing ceramic powders, a binder, a solvent, and the like, with one another to prepare slurry and manufacturing the slurry in a sheet shape having a thickness of several micrometers by a doctor blade method. Then, the ceramic green sheet may be sintered to form the dielectric layer 111.

A conductive paste for an internal electrode may be applied onto the ceramic green sheet to form an internal electrode pattern on the ceramic green sheet. In this case, the internal electrode pattern may be formed by a screen printing method or a gravure printing method. The conductive paste for an internal electrode may include a conductive metal and an additive. The additive may be one or more of a non-metal and a metal oxide. The conductive metal may include nickel. The additive may include barium titanate or strontium titanate as the metal oxide.

A plurality of ceramic green sheets on which the internal electrode patterns are formed may be stacked and pressed to implement the ceramic laminate 115. In this case, the ceramic laminate 115 may include the base layers 116 and 117 for covers disposed at the uppermost portion and the lowermost portion thereof to effectively protect the internal electrodes 121 and 122. In this case, the base layers 116 and 117 for covers may include the same material as that of the dielectric layer 111 or a material different from that of the dielectric layer 111 depending on an intended function, and may be thicker than the dielectric layer 111. Then, the ceramic laminate 115 may be diced in individual chip units, if necessary. In this case, the internal electrodes 121 and 122 may be exposed in order to be connected to the external electrodes 131 and 132. The internal electrodes 121 and 122 exposed by a dicing process may have a uniform width. For example, a difference between the largest width and the smallest width of the internal electrodes 121 and 122 may be less than 0.1 µm.

Figure 6:
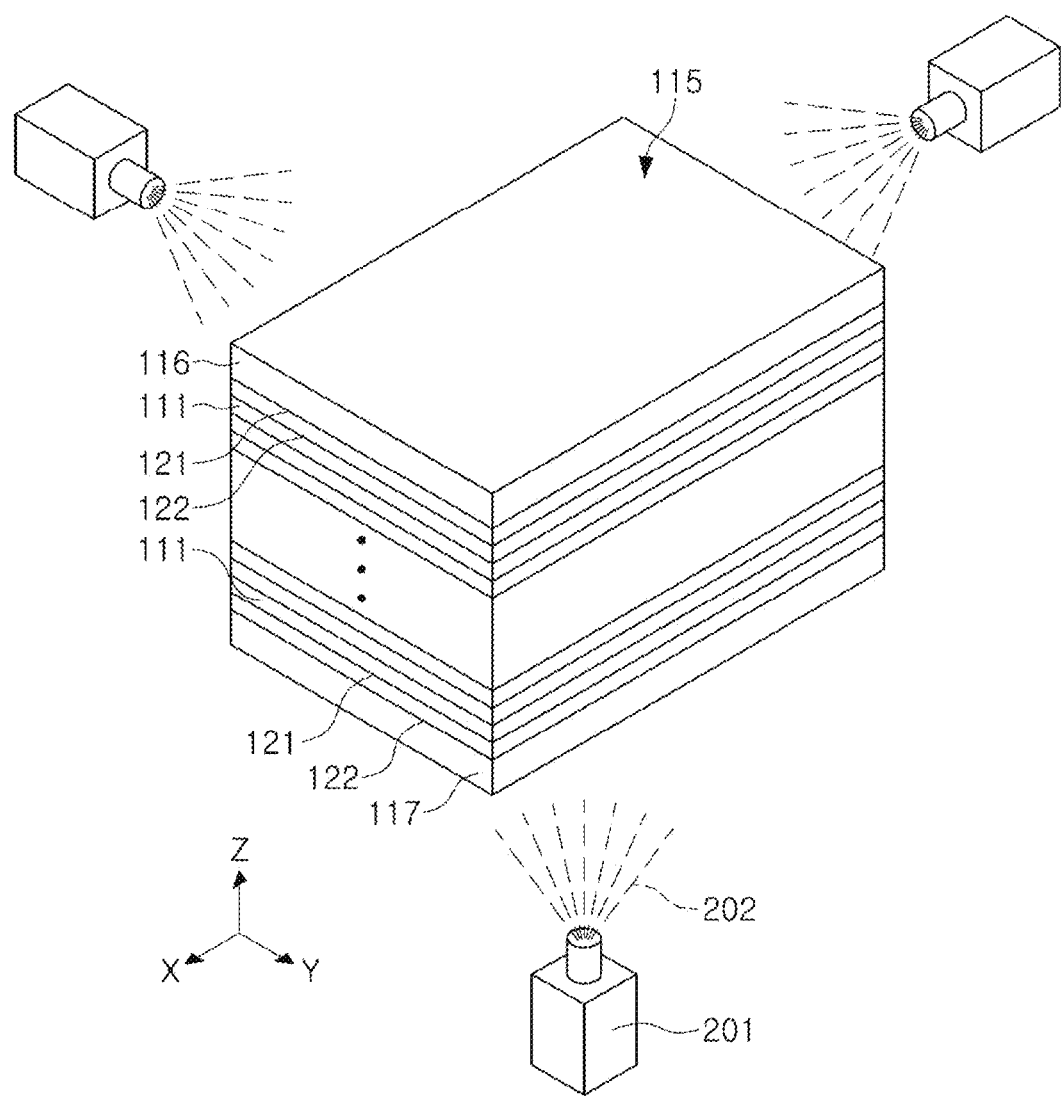
Figure 7:
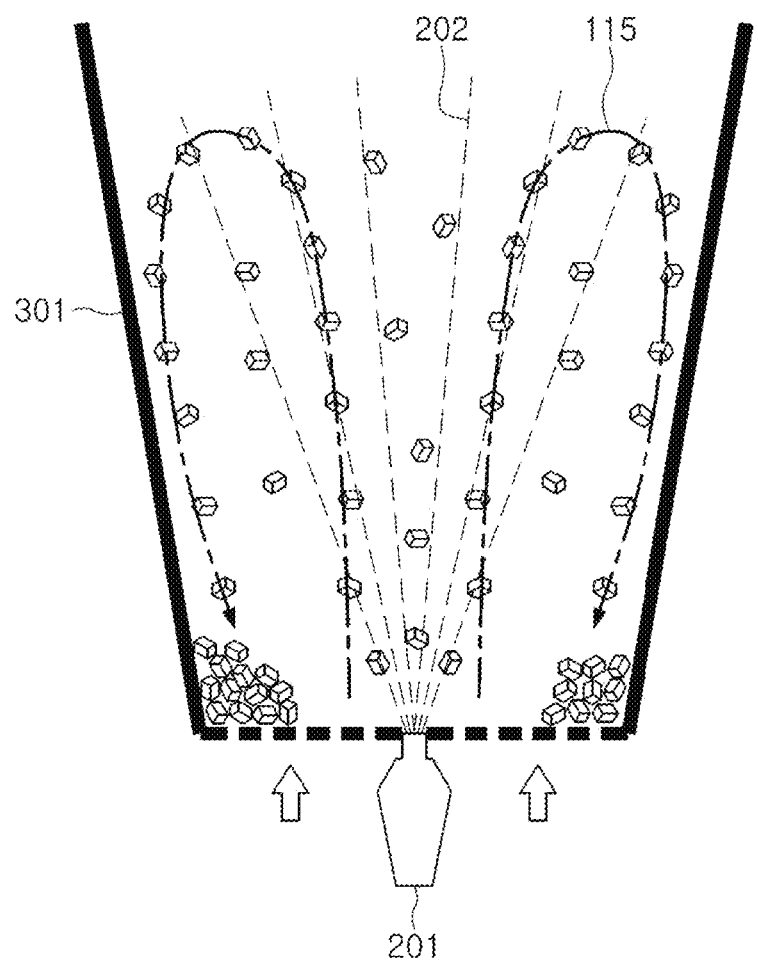
Figure 8:
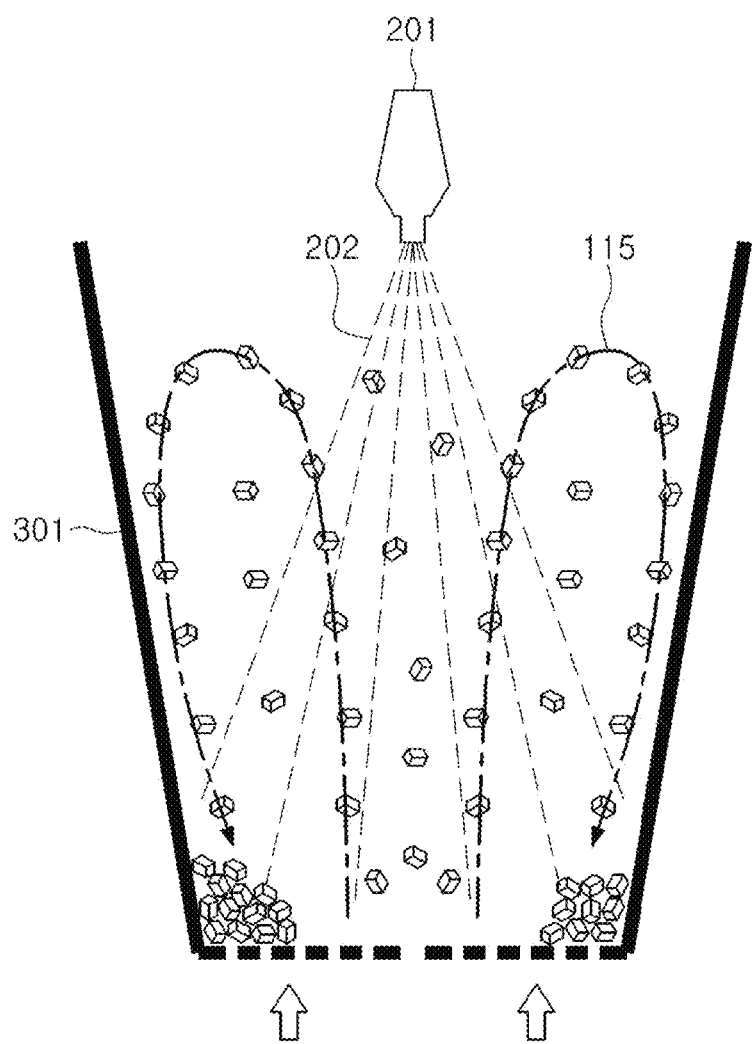

Then, coating layers 118 (see FIG. 10) may be disposed on surfaces of the ceramic laminate 115. To this end, an appropriate coating process may be performed. In the present exemplary embodiment, as illustrated in FIG. 6, a method of spray-coating a ceramic slurry 202 using a spray apparatus 201 may be used. In this case, the ceramic slurry 202 may further include the same component as that of the ceramic green sheet for forming the dielectric layer 111 or a component giving fluidity to the ceramic green sheet, for example, a liquid binder, or the like. An example of the present coating process will be described. First, as illustrated in FIGS. 7 and 8, the ceramic laminates 115 may be disposed in a coating apparatus 301, and air currents (denoted by arrows in FIGS. 7 and 8) may be generated from the bottom of the coating apparatus 301 toward the top thereof. After the ceramic laminate 115 is floated in this manner, the ceramic slurry 202 may be sprayed to the ceramic laminate 115 through a nozzle of the spray apparatus 201 disposed on the bottom (see FIG. 7) or the top (see FIG. 8) of the coating apparatus 301. Unlike the forms illustrated in FIGS. 7 and 8, the spraying apparatus 201 may also be disposed on a side portion of the coating apparatus 301. The coating layers 118 having a uniform thickness may be disposed on the surfaces of the ceramic laminates 115 in such a coating manner. The coating layers 118 are separately formed after the ceramic laminate 115 is manufactured, such that a margin region of the body 110 may be uniformly and thinly formed, and a margin having a sufficient thickness in a corner region of the body 110 having a poor moisture resistance performance may be obtained.

Figure 9:
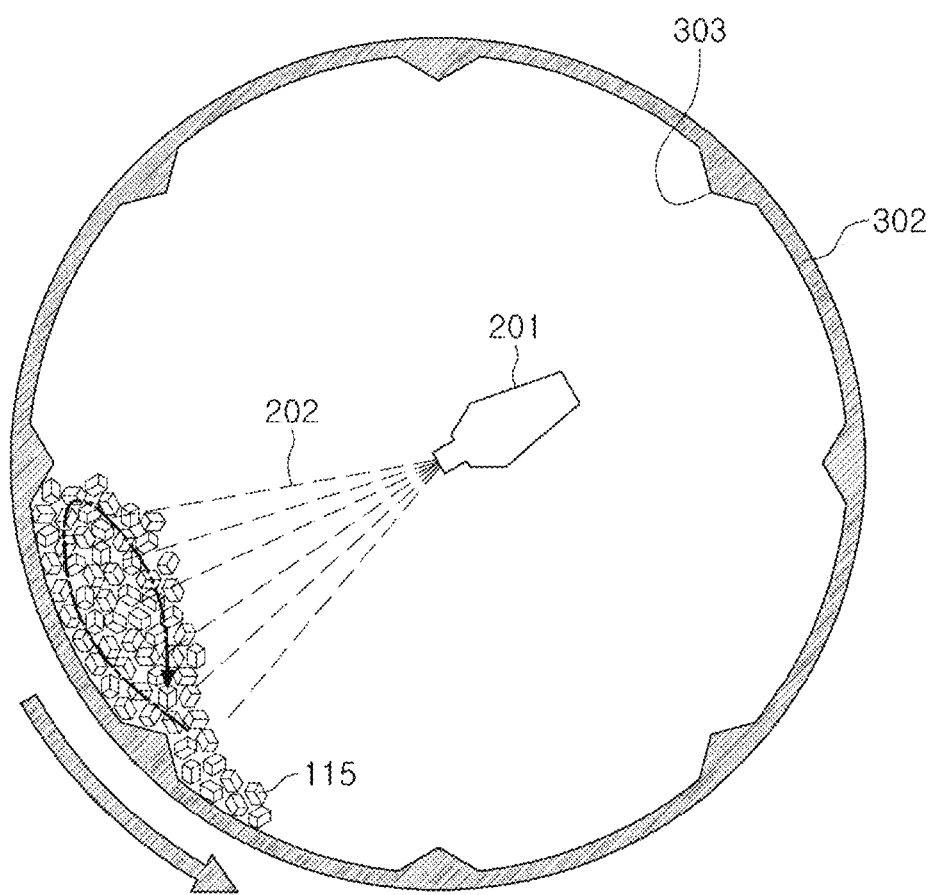

In addition, as another coating manner, as illustrated in FIG. 9, a coating apparatus 302 having a spherical container form may be used. In this case, protrusions 303 may be disposed on an inner side of the coating apparatus 302. The ceramic laminate 115 may be overturned and moved while the coating apparatus 302 is rotated. In this process, the ceramic laminate 115 may be uniformly coated.

Figure 10:
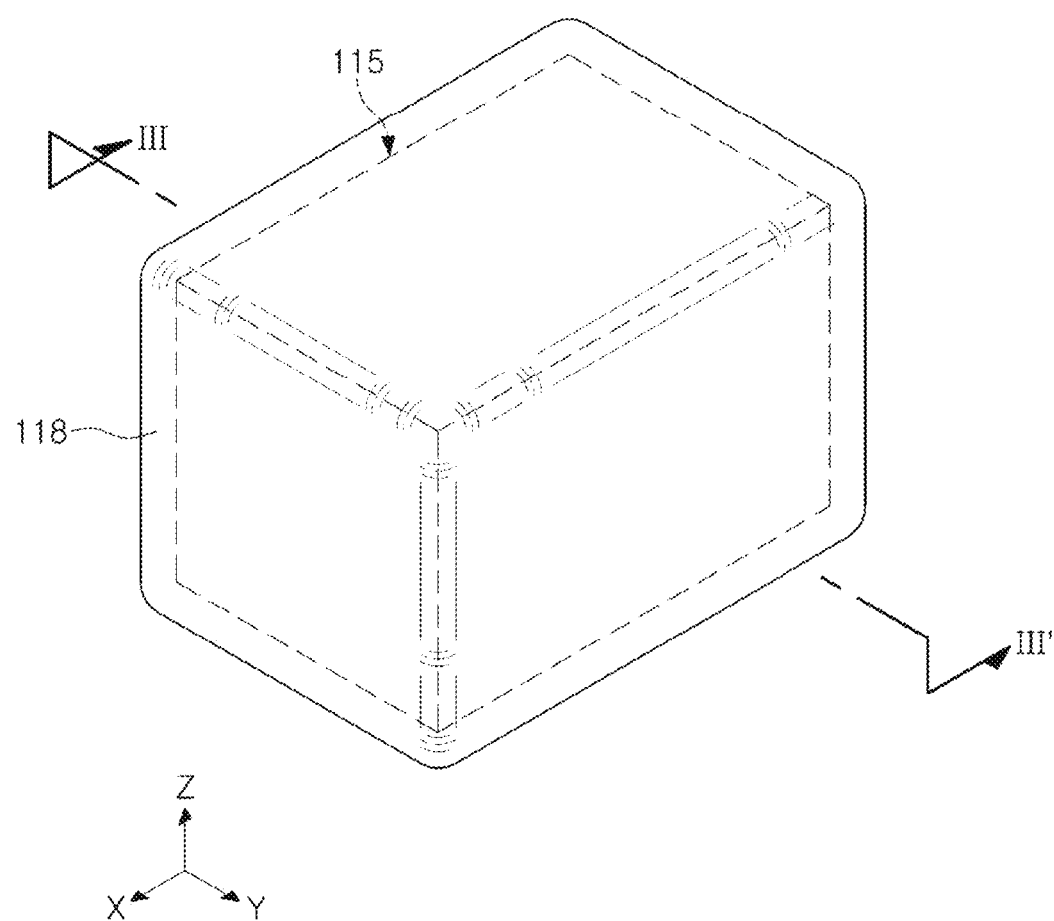

FIG. 10 is a view illustrating a state in which the coating layers 118 are disposed on all the surfaces of the ceramic laminate 115, and FIG. 11 is a cross-sectional view taken along line III-III' of FIG. 10. As illustrated in FIGS. 10 and 11, when the ceramic laminate 115 is subjected to the coating process described above, corners of the coating layers 118 may have curved surfaces. Then, the ceramic laminate 115 may be sintered in a state in which the coating layers 118 are applied. Therefore, the ceramic green sheets included in the ceramic laminate 115 and the coating layers 118 may become an integral body.

Figure 12:
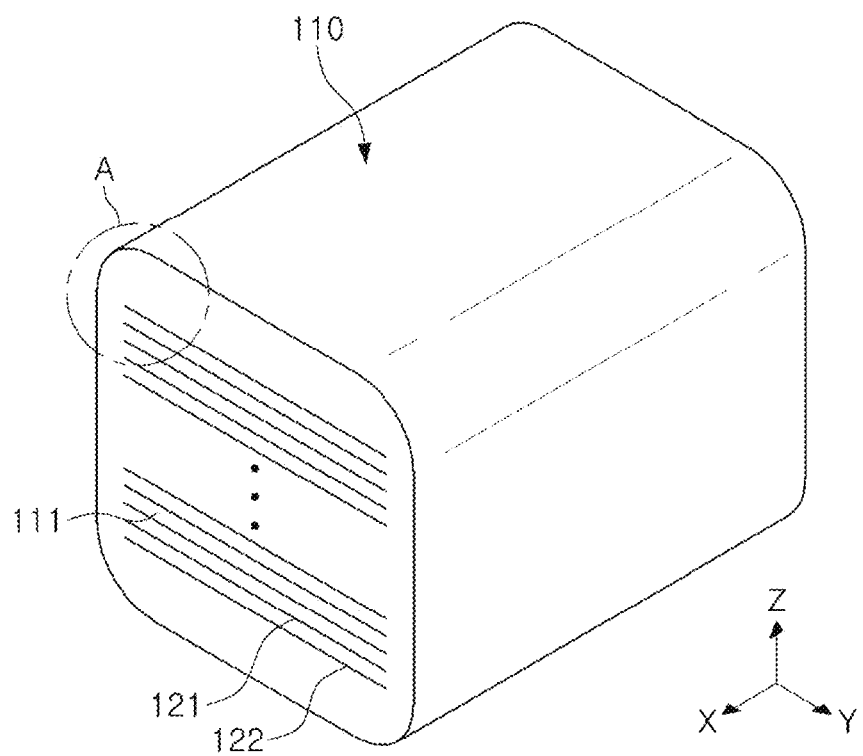

After a sintering process, parts of the body 110 may be removed to expose the internal electrodes 121 and 122. Here, surfaces of the body 110 on which the internal electrodes 121 and 122 are exposed may correspond to the first surface S1 and the second surface S2 described with reference to FIG. 1. However, other surfaces of the body 110 may also be exposed, if necessary. As a surface polishing process of removing parts of the body 110, a polishing process, a grinding process, or the like, may be used. FIG. 12 illustrates the body 110 subjected to the surface polishing process after the sintering process and the internal electrodes 121 and 121 exposed from the body 110. Then, the external electrodes may be disposed to be connected to the exposed internal electrodes 121 and 122.

Figure 13:
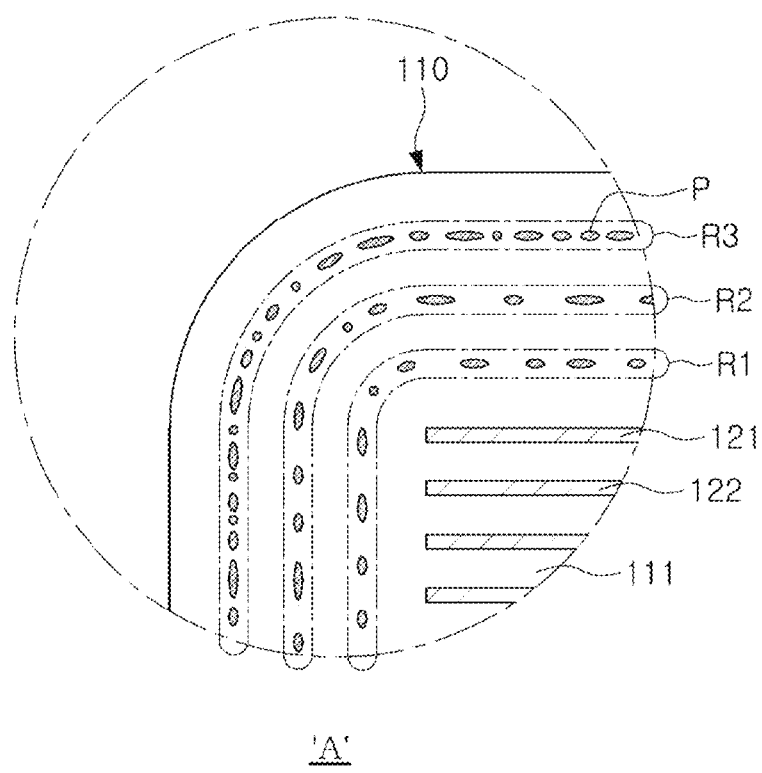

Meanwhile, in the process described above, the dielectric layer 111 may be formed of the ceramic green sheet, and margin regions, accurately, regions except for the base layers 116 and 117 for covers in the margin regions may be formed by a coating process by the spraying of the ceramic slurry. Therefore, there may be a difference in an internal structure of the body 110 after the sintering process. In other words, characteristics such as a density or the like may be different between the internal electrode region 120 and the margin regions 112 and 113 of the body 110. This will be described with reference to FIG. 13. FIG. 13 is an enlarged plan view illustrating region A of FIG. 12.

When comparing a density of the dielectric layer 111 between the margin regions and a region (that is, the internal electrode region) other than the margin regions in the body 110, the density may be relatively lower in the margin regions 112 and 113 than in the region other than the margin regions. In addition, in the margin regions 112 and 113, a density may be relatively higher in a region close to the internal electrodes 121 and 122 than in a region close to an outer portion of the body 110. In other words, in the margin regions 112 and 113, the dielectric layers 111 may be at least two layers having different densities, and a density of the dielectric layer 111 may be higher in a layer, adjacent to the plurality of internal electrodes 121 and 122, of the at least two layers. In this case, regions corresponding to the base layers 116 and 117 for covers before the sintering process are formed by stacking the ceramic green sheets, and may thus have a density higher than that of the other regions of the margin regions 112 and 113.

These density characteristics of the margin regions 112 and 113 may be obtained by the coating process described above. When the ceramic slurry is sprayed, several-fold thin coating layers may be formed on the surfaces of the ceramic laminate 115, and a plurality of pores may be formed between the coating layers and may remain even after the sintering process. As illustrated in FIG. 13, a plurality of needle-like pores P may remain in the margin regions 112 and 113 of the body 110. Since the plurality of needle-like pores P are generated in a process of forming the several-fold thin coating layers, a plurality of rows R1, R2, and R3 formed by the plurality of needle-like pores P may have a form in which they are aligned in a shape corresponding to an outer shape of the body 110. Pore densities of the plurality of rows R1, R2, and R3 by the plurality of needle-like pores P may be different from one another, and as a region becomes closer to the surface of the body 110, the region may be later coated, and a pore density of the region may thus be relatively lower.

As set forth above, the multilayer capacitor according to the exemplary embodiment of the present disclosure may be advantageous in terms of miniaturization, may have a high capacitance, and may have excellent moisture resistance characteristics to have a high reliability.

While exemplary embodiments have been shown and described above, it will be apparent to those skilled in the art that modifications and variations could be made without departing from the scope of the present invention as defined by the appended claims.

What is claimed is:

1. A multilayer capacitor comprising:
    a body including a stacked structure of a plurality of dielectric layers and a plurality of internal electrodes stacked with each of the plurality of dielectric layers interposed therebetween; and
    external electrodes disposed on external surfaces of the body and electrically connected to the plurality of internal electrodes,
    wherein the body includes an active portion forming a capacitance by the plurality of internal electrodes disposed therein and cover portions disposed on upper and lower surfaces of the active portion, respectively, in a stacking direction of the plurality of dielectric layers, the body has a first surface and a second surface, to which the plurality of internal electrodes are exposed, opposing each other in a length direction, a third surface and a fourth surface which oppose each other in the stacking direction, and a fifth surface and a sixth surface which are connected to the first to fourth surfaces and oppose each other in a width direction perpendicular to the length direction,
    in the body, corners of the cover portions viewed in a cross-section taken in the width-stacking direction include curved surfaces,
    a margin ($\delta$) of each of the corners of the cover portions is greater than or equal to a margin (Wg) of side portions of the body, where the margin ($\delta$) is a distance from a surface of the corners of the cover portions to a closest portion of the plurality of internal electrodes, and the margin (Wg) is a distance from the fifth or sixth surface of the body to a closest portion of the plurality of internal electrodes, and
    wherein the margin ($\delta$) of each of the corners formed as the curved surfaces in the cover portions is smaller than a radius (R) of curvature of the curved surfaces.
2. The multilayer capacitor of claim 1, wherein $10\ \mu m \leq R \leq T/4$ in which T is a thickness of the body in the stacking direction.

3. The multilayer capacitor of claim 1, wherein $1 \leq \delta/Wg \leq 1.2$.

4. The multilayer capacitor of claim 1, wherein $0.5$ $\mu m \leq Wg \leq T/12$, where T is a thickness of the body in the stacking direction.

5. The multilayer capacitor of claim 1, wherein $0.5$ $\mu m \leq Wg \leq 15$ $\mu m$.

6. The multilayer capacitor of claim 1, wherein $Wg<Tg$ in which Tg is a margin of each of the third surface and the fourth surface.

7. The multilayer capacitor of claim 1, wherein $10$ $\mu m \leq R \leq 60$ $\mu m$.

8. The multilayer capacitor of claim 1, wherein the plurality of internal electrodes have a uniform width.

9. The multilayer capacitor of claim 1, wherein in the body, when outer regions surrounding the plurality of internal electrodes are margin regions, a density of a dielectric layer is lower in the margin regions than in other regions of the body.

10. A multilayer capacitor comprising:
a body including a stacked structure of a plurality of dielectric layers and a plurality of internal electrodes stacked with each of the plurality of dielectric layers interposed therebetween; and
external electrodes disposed on external surfaces of the body and electrically connected to the plurality of internal electrodes,
wherein the body includes an active portion forming a capacitance by the plurality of internal electrodes disposed therein and cover portions disposed on upper and lower surfaces of the active portion, respectively, in a stacking direction of the plurality of dielectric layers,
the body has a first surface and a second surface, to which the plurality of internal electrodes are exposed, opposing each other, a third surface and a fourth surface which oppose each other in the stacking direction, and a fifth surface and a sixth surface which are connected to the first to fourth surfaces and oppose each other,
in the body, at least some corners of the cover portions include curved surfaces,
a margin ($\delta$) of each of the at least some corners of the cover portions is greater than or equal to a margin (Wg) of side portions of the body, where the margin ($\delta$) is a distance from a surface of the at least some corners of the cover portions to a closest portion of the plurality of internal electrodes, and the margin (Wg) is a distance from the fifth or sixth surface of the body to a closest portion of the plurality of internal electrodes,
in the body, when an outer region surrounding the plurality of internal electrodes is a margin region, a density of a dielectric layer in the margin region is lower than a density of a dielectric layer in other regions of the body,
wherein the margin region includes a plurality of pores, and
wherein the plurality of pores are needle-like pores.

11. The multilayer capacitor of claim 10, wherein in the margin region, the plurality of dielectric layers include at least two layers having different densities, and a density of a dielectric layer adjacent to the plurality of internal electrodes is higher than a density of another dielectric layer of the at least two layers.

12. The multilayer capacitor of claim 10, wherein the plurality of pores have a form in which the plurality of pores are aligned in a shape corresponding to an outer shape of the body.

13. The multilayer capacitor of claim 12, wherein the plurality of pores are composed of a plurality of rows, where each row is defined as a row of pores that are aligned in the shape corresponding to the outer shape of the body.

14. The multilayer capacitor of claim 13, wherein pore densities of the plurality of rows are different from one another, and
a pore density of a region closer to an outer surface of the body is lower than densities of other regions in the plurality of rows.

15. A multilayer capacitor comprising:
a body including a stacked structure of a plurality of dielectric layers and a plurality of internal electrodes stacked with each of the plurality of dielectric layers interposed therebetween; and
external electrodes disposed on external surfaces of the body and electrically connected to the plurality of internal electrodes,
wherein the body includes an active portion forming a capacitance by the plurality of internal electrodes disposed therein and cover portions disposed on upper and lower surfaces of the active portion, respectively, in a stacking direction of the plurality of dielectric layers,
the body has a first surface and a second surface, to which the plurality of internal electrodes are exposed, opposing each other, a third surface and a fourth surface which oppose each other in the stacking direction, and a fifth surface and a sixth surface which are connected to the first to fourth surfaces and oppose each other,
in the body, at least some corners of the cover portions include curved surfaces,
a margin ($\delta$) of each of the at least some corners of the cover portions is greater than or equal to a margin (Wg) of side portions of the body, where the margin ($\delta$) is a distance from a surface of the at least some corners of the cover portions to a closest portion of the plurality of internal electrodes, and the margin (Wg) is a distance from the fifth or sixth surface of the body to a closest portion of the plurality of internal electrodes,
in the body, when an outer region surrounding the plurality of internal electrodes is a margin region, a density of a dielectric layer in the margin region is lower than a density of a dielectric layer in other regions of the body,
wherein the margin region includes a plurality of pores, and
wherein the plurality of pores have a form in which the plurality of pores are aligned in a shape corresponding to an outer shape of the body.

16. The multilayer capacitor of claim 15, wherein the plurality of pores are composed of a plurality of rows, where each row is defined as a row of pores that are aligned in the shape corresponding to the outer shape of the body.

17. The multilayer capacitor of claim 16, wherein pore densities of the plurality of rows are different from one another, and
a pore density of a region closer to an outer surface of the body is lower than densities of other regions in the plurality of rows.

18. The multilayer capacitor of claim 15, wherein in the margin region, the plurality of dielectric layers include at least two layers having different densities, and a density of a dielectric layer adjacent to the plurality of internal electrodes is higher than a density of another dielectric layer of the at least two layers.

* * * * *